April 5, 1966 J. M. BOSKO ETAL 3,244,149
ANIMAL TRAINING SAFETY LEASH STICK
Filed July 29, 1964 2 Sheets-Sheet 1
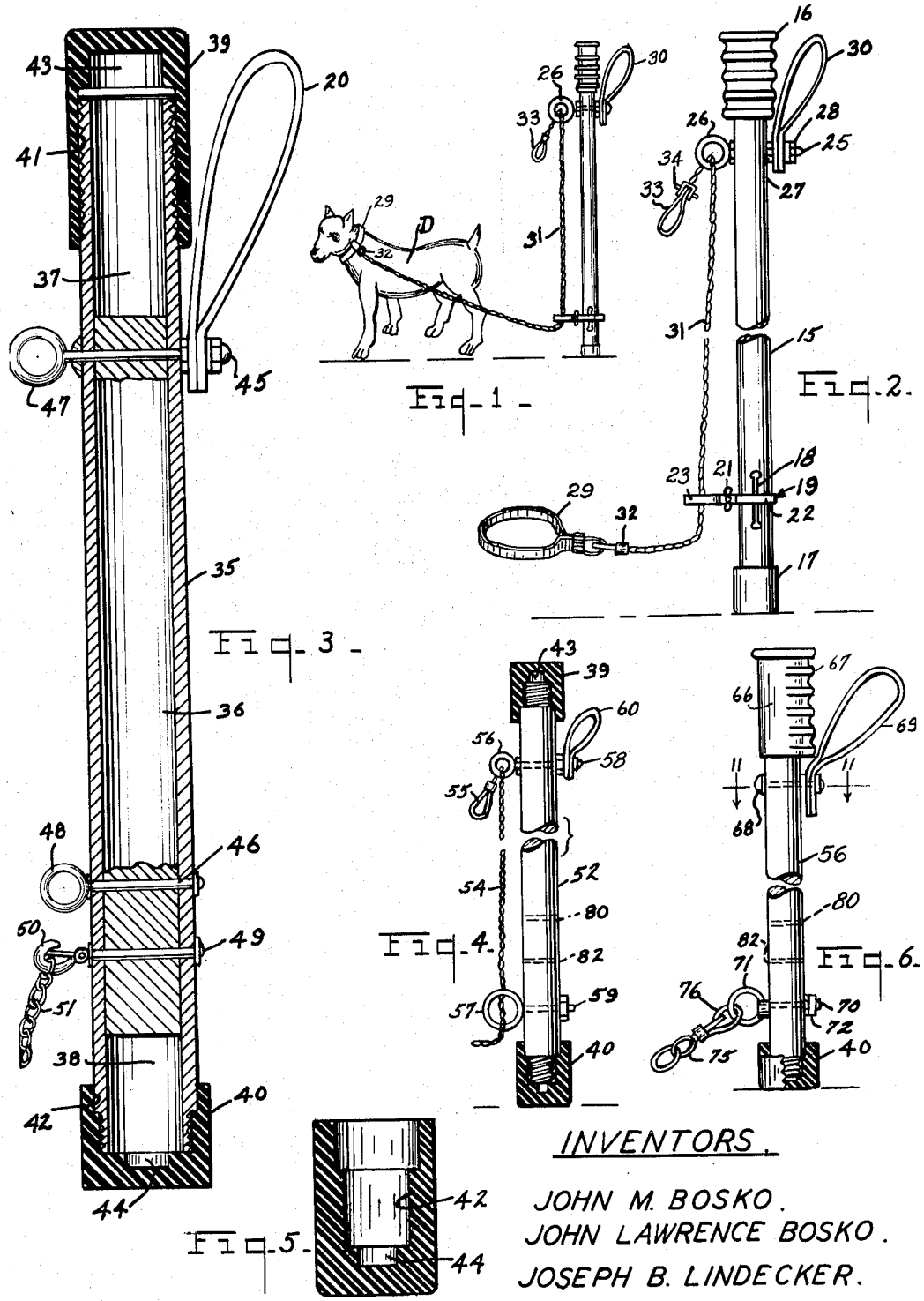
INVENTORS
JOHN M. BOSKO.
JOHN LAWRENCE BOSKO.
JOSEPH B. LINDECKER.

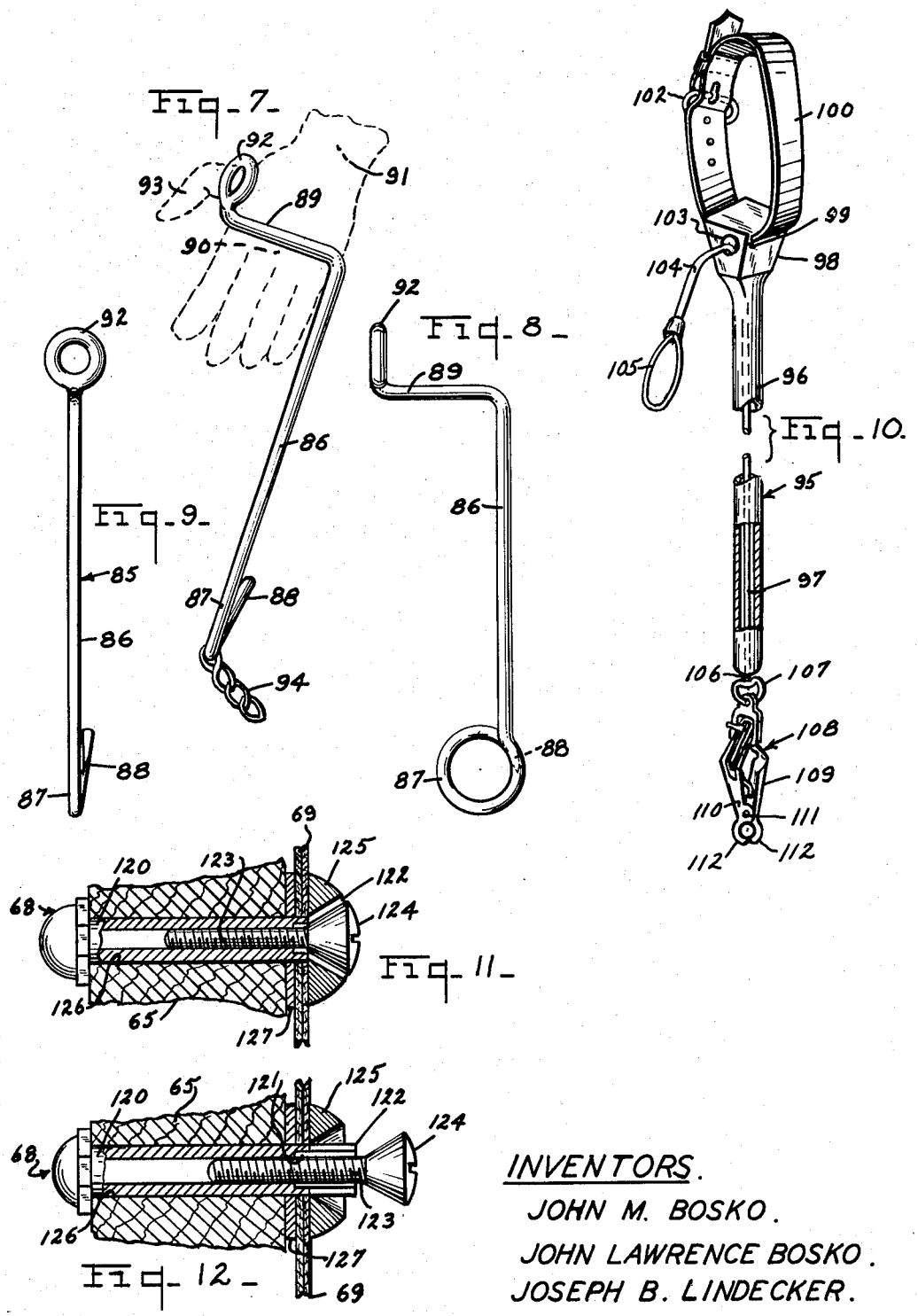

3,244,149
ANIMAL TRAINING SAFETY LEASH STICK
John M. Bosko, 6691 Cleveland Road and Wall St., Ravenna, Ohio; John Lawrence Bosko, Upland, Calif. (831 Willow St., Ontario, Calif.); and Joseph B. Lindecker, 8100 Keystone Ave., Skokie, Ill.
Filed July 29, 1964, Ser. No. 385,924
4 Claims. (Cl. 119—29)

This invention relates to new and useful improvements in animal training safety sticks for use by people with courtesy for public safety.

One object of this invention is to provide a rigid animal training stick of specified length having the flexible animal leash attached to, or controlled by the lower end portion of the stick, restricting the animal attached therewith.

A further object of this invention is to provide an animal training stick having hollow compartments therein for use as personal litter container for candy, gum wrappers, medical pills for the animals and/or cubes of food for use in training of the animals.

A further object of this invention is to provide a convenient and practical animal training device with courtesy for public safety.

A further object of this invention is to provide necessary and important ways and means to restrain any animal pets such as dogs, monkeys and cats from becoming public nuisances to the owner and other people on the sidewalks, in stores where shopping is being done, or in traveling to other places by car, train or the like.

Another object of this invention is to restrict the animal attacked to the training stick, controlling the distance to and from the owner or trainer, eliminating fear to people coming near to the animal pets.

Still another object of this invention is to provide, in a manner as hereinafter set forth, an instrument for the purpose set forth which is simple in its construction and arrangement, strong, durable, compact, thoroughly efficient in its use and comparatively inexpensive to manufacture.

With the foregoing and other objects in view that will appear as the nature of our invention is better understood, the same consists in the novel features of construction, combination and arrangement of parts illustrated in the accompanying drawing and more particularly pointed out in the appended claims.

In the drawing:

FIGURE 1 is a side elevational view of the animal training safety stick embodying the invention, and illustrating the stick as applied with a dog;

FIGURE 2 is an enlarged side elevational view of the training stick illustrating a metal instrument with a flexible chain type leash embodied therewith;

FIGURE 3 is an enlarged side elevational view of this invention showing the training stick having a tubular metal shell, reinforced by a cylindrical wood member in the central portion and providing hollow compartments at each end portion thereof;

FIGURE 4 shows a side elevation of this invention formed by a wooden stick, metal eyelets, rubber thimble type members and flexible chain;

FIGURE 5 is a sectional view through the cap or thimble, showing on the bottom end of the stick in FIG. 4;

FIGURE 6 is a modified form of wooden training stick where the chain leash is snap locked to a metal ring, or eyelet secured to the lower end of the stick;

FIGURE 7 is a perspective view of a modified training stick made in a single piece of metal rod, illustrating the application of the invention;

FIGURE 8 is a side view of the stick shown in FIG. 7;

FIGURE 9 is a front edge elevational view of the stick shown in FIGURES 7 and 8;

FIGURE 10 is a perspective elevational view of a modified type of this invention, embodying a hand strap, a flexible leash and a snap fastener attached to the lower free end of the leash.

FIGURE 11 is a fragmentary sectional view taken substantially on line 11—11 of FIG. 6; and FIGURE 12 is a view similar to FIGURE 11, showing the position of the bolt parts preliminarly to the locking adjustment thereof.

Referring to FIGURES 1 and 2 of the drawing, the trainer stick comprises a tubular metal handle or stick 15, as it is often called, and threaded at both ends. A rubber thimble type grip 16 is arranged upon the upper end of the stick 15 and a rubber thimble type cap 17 is arranged upon the lower end thereof. Said stick 15 is provided with a vertical slit type opening 18 a short distance above said cap 17. A metal strap 19 is clamped to said stick and over said slit 18. Said metal strap is so formed that it has the configuration of a figure eight with two loops and having a bolt and wingnut 21 arranged transversely therebetween and through openings in the side walls thereof. The one loop 22 fits tightly on the stick 15 by turning of the wing-nut 21; the integral loop 23 forming a leash guide means. An eyelet type bolt 25 is assembled through holes formed in said stick 15 and below grip 16, the one end having an eye 26 arranged substantially above loop 23, the opposite end having a washer 27, and a threaded nut 28 screwed thereon with a leather strap or flexible handle 30 having its free ends perforated and assembled thereon and between said washer and nut. A chain type leash 31 extends through both said eye 26 and loop 23 and has a snap fastener 32 at its lower end and a flexible grip 33 attached at its upper end. The openings in both said eye 26 and loop 23 are large enough for said snap fastener 32 to pass therethrough; however, the flexible grip 33 has an enlarged base portion 34 which will not pass through the eye 26, a measure of safety. The snap 32 is capable of fastening to a dog collar 29, adjustable and removable from any animal, such as the dog "D" shown in FIG. 1.

Referring to FIGURE 3 of the drawing, the stick means comprises a tubular metal stick 35, a substantial equivalent of stick 15, having a wooden cylindrical plug 36 arranged centrally between the ends thereof, leaving a hollow chamber 37 at the upper end and a chamber 38 at the lower end thereof. A rubber thimble, or cap 39 forms a closure for the upper end and a cap 40 forms a closure for the lower end thereof. The caps 39 and 40 are provided with tubular bores 41 and 42 respectively, and a reduced bores 43 and 44 respectively. An eye bolt 45, a substantial equivalent of eye bolt 25, extends through the metal wall of stick 35 and through the bore in upper end of wooden plug 36. A similar eye bolt 46, similar to bolt 45, extends through the walls of stick 35 and through the lower end of plug 36. Said bolt 45 has a flexible leather strap type grip 20 secured therewith. Said eyebolts 45 and 46 have eyes 47 and 48 respectively and are secured to stick 35 by threaded nuts. The eyes 47 and 48 are for use with a flexible leash 51, similar to leash 31 including a snap fastener 32 for connecting to a ring on a dog color, when so desired. A bolt 49 extends through the stick 35 below said bolt 46 and above said cap 40. The head of the bolt 49 is provided with a snap type fastener 50, so formed as to receive any flexible chain type leash, such as leash 51.

Referring to FIGURE 4 a training stick 52 is made of solid wood and threaded at both ends, adapted to receive thimbles 39 and 40 shown in FIGURES 3 and 5, with interior bores 41 and 42 and reduced bores 43 and 44. A flexible leash 54 with leather grip 55 may be used with said stick 52 by assembly thereof through eyes 56 and 57 of bolts 58 and 59 respectively. A flexible leather handle 60 is secured to bolt 58 at the upper end of stick 52.

Referring to FIG. 6 a wooden trainer stick 65 is shown having a rubber grip 66 with annular ribs 67. A bolt 68 extends through the stick 65 and has leather handle 69 secured therewith. As shown by FIGURES 11 and 12 the bolt 68 embraces an internally threaded female member 120, internally recessed, as indicated at 121, at one end, and provided with a split, resilient slotted extension affording the spring segments or leaves 122. The male member of the bolt comprises a screw 123, having a head 124, and the washer 125 is recessed to receive the head of the male member. In assembly the bolt 68 is inserted through the bore 126 of the stick 65, that is the female screw member 120 is inserted therethrough, after which the screw 123, is threaded into the female member as shown by FIG. 12. As said screw 123 is screwed into place, the head 124 thereof bears against the segments 122 of the female member, distending the same so that the head is tightly jammed in countersunk relation with the washer 125, and is surrounded by the distended spring segments, as clearly shown in FIG. 11. The frictional engagement of the segments against the head 124 prevents accidental loosening of the screws by rotation thereof. The purpose of the enlarged recess 121, in the female member is to permit the male member to be inserted a sufficient amount to insure clamping engagement with the resilient segments 122, preventing premature contact with the rigid portion of the female member. The washer 125 presses the free ends of the leather handle 69 against the washer 127 which rests against the stick 65. Said bolt 68 provides a novel and efficient means to securely clamp the leather handle 69 to the stick 65. FIGURE 6 shows a cap 41 screw threaded to the lower end of stick 65. A bolt 70 extends through the stick 65 near its lower end and having a ring 71 at one end and a threaded nut 72 at its opposite end. A flexible chain 75 is shown with a spring snap fastener 76 assembled to the ring 71. Said bolts 59 and 70, shown in FIGURES 4 and 6 may be relocated, as a plurality of transverse bores 80 and 82 are shown dotted in sticks 52 and 65.

It is clearly seen that an animal attached to leash 31, 51 and/or 54 can be drawn in close to the end of the sticks 15, 35 and 52 simply by pulling upwardly on hand grips 33 and 55. The owner can hold the animal away from him at a distance equal to the length of the stick. When a short leash, such as 51 and 75, is used the animals are held away at a distance equal to the length of the stick less the length of the leash. This provides a trainer and safety stick of novelty.

Referring to FIGURES 7, 8, and 9, a trainer stick 85 is made or cast in a single piece, and is simple and economical in construction, and highly efficient and durable in use. The stick 85 comprises the straight rod-like body portion 86, formed at its lower end with a substantially closed split ring 87 with point 88. Said body portion 86 is bent at right angles at its upper end to form the straight handle 89, which extends across and fits in the palm 90 of the hand 91. In using the stick the outer end of the straight handle 89 is likewise bent substantially at right angles to form the perpendicularly disposed ring or loop 92, which fits around or encircles the base of the thumb 93 and prevents the stick 85 from slipping out of the hand. This stick 85 can be used to train dogs and the like, the dog "D" can be attached to the chain 94; the chain 94 is assembled to the split ring 87, as shown by FIG. 7; whereby the dog can be held at a distance from the trainer.

Referring to FIGURE 10, a trainer stick is shown, having a cylindrical, longitudinal body 96 with a vertical bore 97, a truncated pyramid top head portion 98 with horizontal passageway 99 therethrough and through which a flexible strap type handle 100 is passed. The strap is adjustable as to size by changing the position of the buckle 102. The head 98 has a vertical passageway therein joined by a horizontal passage with exterior opening 103. A flexible leash 104 extends through bore 97 and out through the opening 103. A flexible hand-loop 105 is attached to the upper free end of leash 104 and a shank 106 is attached to the lower free end thereof. Said shank 106 being secured to the lower end of the leash 104 forming a swivel connection with a snap-fastener-attaching ring 107 which is pivotally connected with the upper end of the snap-fastener 108. Said top head portion 98 having four flat sides and a flat top surface. The snap-fastener 108 has pivotally assembled cross-jaws 109 and 110 held together by pivot pin 111 and providing clamping jaws 112 which may be attached to any animal collar such as dog collar 29. Said snap-fastener has special advantages when used as the hook fastener of a dog leash, because of its ease with which the fastener can be connected to or disconnected from the ring of the dog collar; it will not be accidentally disconnected from the ring or other article to which it is secured and especially true in connection with a dog leash. None of the strain on the snap-fastener jaws 112 is transmitted to the leash, or the leather handle 105, and allows the trainer to pull on the handle 105, and draws the dog closer to the lower end of the stick 95.

Referring to FIG. 3, the chambers 37 and 38 are of sufficient size to hold plastic tubes filled with vitamins or food and can provide a supply means needed while training dogs and the like.

Referring to FIGURES 1, 2, 4, and 10 especially, it is clearly seen how the dog leash can be adjusted as to operative length, by pulling the upper end portion of the leash upwardly and away from the top of the stick, the lower end of the leash attached to the collar of the dog, or other animal, will draw the dog close to the lower end of the stick, whereby the dog is safely held away from any other person assumed to be in danger.

It is clear that various conventional forms of a stick may be constructed, as for instance the upper end of the stick may be a tubular metal portion with the lower portion formed of wood and telescoping into and partially out of the upper metal portion.

It is clearly seen that the sticks shown and the parts attached thereto provide an efficient device to train an animal, it is not possible for a dog, or the like, to be in a position to attack the owner because the training stick prevents the dog to go either forward or backward near the owner. By this type, the dogs have no other recourse but to behave properly, they will not be able to tangle about the trainers feet to cause the trainer to fall, or to mess up the trainer's clothes, or cause other damage often caused when using the old-fashioned loose chain and/or cords.

The flexible leather handles attached to the upper ends of the sticks permits free movement of the stick; however, when it is necessary to hold the sticks rigid it is easy to grasp the rigid upper ends of the sticks.

The terms and expressions which have been herein employed are used as terms of description and not limitations and there is no intention, in using of such terms and expressions, of excluding any equivalent of the features shown and described. It is recognized that various modifications are possible within the scope of the invention claimed.

Having thus described this invention, what we claim as new and desire to secure by Letters Patent of the United States is:

We claim:

1. An animal trainer device consisting of a rigid member, a flexible leash, a flexible loop on one end of said leash and a snap fastener on the opposite end of said leash, an eye-ring attached to the upper end portion of said rigid member and the upper end portion of said leash extending therethrough, an eye-ring attached to the lower end portion of said rigid member and the lower end portion of said leash extending therethrough, whereby said snap fastener is adapted to be drawn close to the lower end of said rigid member as the loop end of the leash is drawn upwardly and prevent any animal attached to said snap fastener from becoming too close to the trainer.

2. An animal trainer device comprising a rigid elongated tubular member, a rubber thimble member removably arranged upon the upper end thereof, a rubber cap member removably arranged upon the lower end thereof, an elongated solid plug rigidly assembled within the central portion of said tubular member, a chamber formed between said plug and said thimble inside said tubular member, a second chamber formed between said plug and said cap and said chambers adapted to hold food or the like for animals, a flexible handle attached to one end of a bolt extending transversely through the upper end portion of said member, and a ring attached to the opposite end of said bolt, a second bolt extending transversely through the lower end portion of said member and a second ring attached to one end thereof and arranged beneath and in vertical alignment with said first ring, and a flexible leash extending through both said rings and movable therein and adapted to be connected with a collar on an animal and providing retention of the animal.

3. The animal trainer device as set forth in claim 2, wherein the opposite ends of said tubular members are provided with external threads and said thimble and said cap members are adapted for application to said opposite ends, said thimble and said cap each being formed of yieldable material and provided with an axial longitudinal bore closed at one end by a crown which forms a contacting end therefore, each of said bores having respective intercommunicating portions of two diameters with the lesser diameter thereof lying adjacent to said crown thereof and the walls being complemental to and adapted for frictional engagement with the screw threads of said tubular member, and the portions of greater diameter extending through the end of the thimble and cap opposite to said crowns therein and being complemental to the transverse dimension of the tubular member and their walls being adapted for frictional engagement with the portions of said tubular members adjacent to the ends of said tubular member adjacent to said screw threaded ends.

4. An animal trainer device including a rigid stick provided with a thimble on its upper end and a cap on its lower end, a flexible leash, a flexible loop on one end of said leash and a snap fastener on the opposite end of said leash, an eye-ring attached to the upper end portion of said rigid stick and the upper end portion of said leash extending therethrough, an eye-ring attached to the lower end portion of said rigid stick and the lower end portion of said leash extending therethrough, said stick comprising an elongated body having each of its ends provided with an axially outstanding neck having a diameter less than the transverse dimension of the stick body, said thimble and cap being formed of yieldable material and each provided with an axial longitudinal bore closed at one end of by a crown which provides an exterior contacting end thereof, each said bore having respective intercommunicating portions of two diameters, with the portion of less diameter lying adjacent to said crown thereof and its walls being complemental to and adapted for frictional engagement with either of said necks, and the portion of greater diameter extending through the ends of the thimble and cap opposite to said crowns and being complemental to the transverse dimension of the stick body and its wall being adapted for frictional engagement with the portion of said stick body adjacent to either of said necks.

References Cited by the Examiner

UNITED STATES PATENTS

| | | | |
|---|---|---|---|
| 794,563 | 7/1905 | Stahlknecht | 119—106 |
| 1,924,596 | 8/1933 | Davis | 119—109 |
| 2,322,897 | 6/1943 | VandenBogaerde | 119—109 |
| 2,337,970 | 12/1943 | Cassell | 119—109 |
| 2,704,052 | 3/1955 | Wood | 119—153 |
| 2,714,873 | 8/1955 | Mosby | 119—109 |
| 2,784,698 | 3/1957 | Dieppa | 119—109 |
| 2,911,947 | 11/1959 | Kramer | 119—109 |
| 3,099,250 | 7/1963 | Soles | 119—114 |

SAMUEL KOREN, *Primary Examiner.*

ALDRICH F. MEDBERY, *Examiner.*